June 18, 1968 R. M. JENSEN 3,388,534
BAG FILTER ARRANGEMENT
Filed June 3, 1965 2 Sheets-Sheet 1
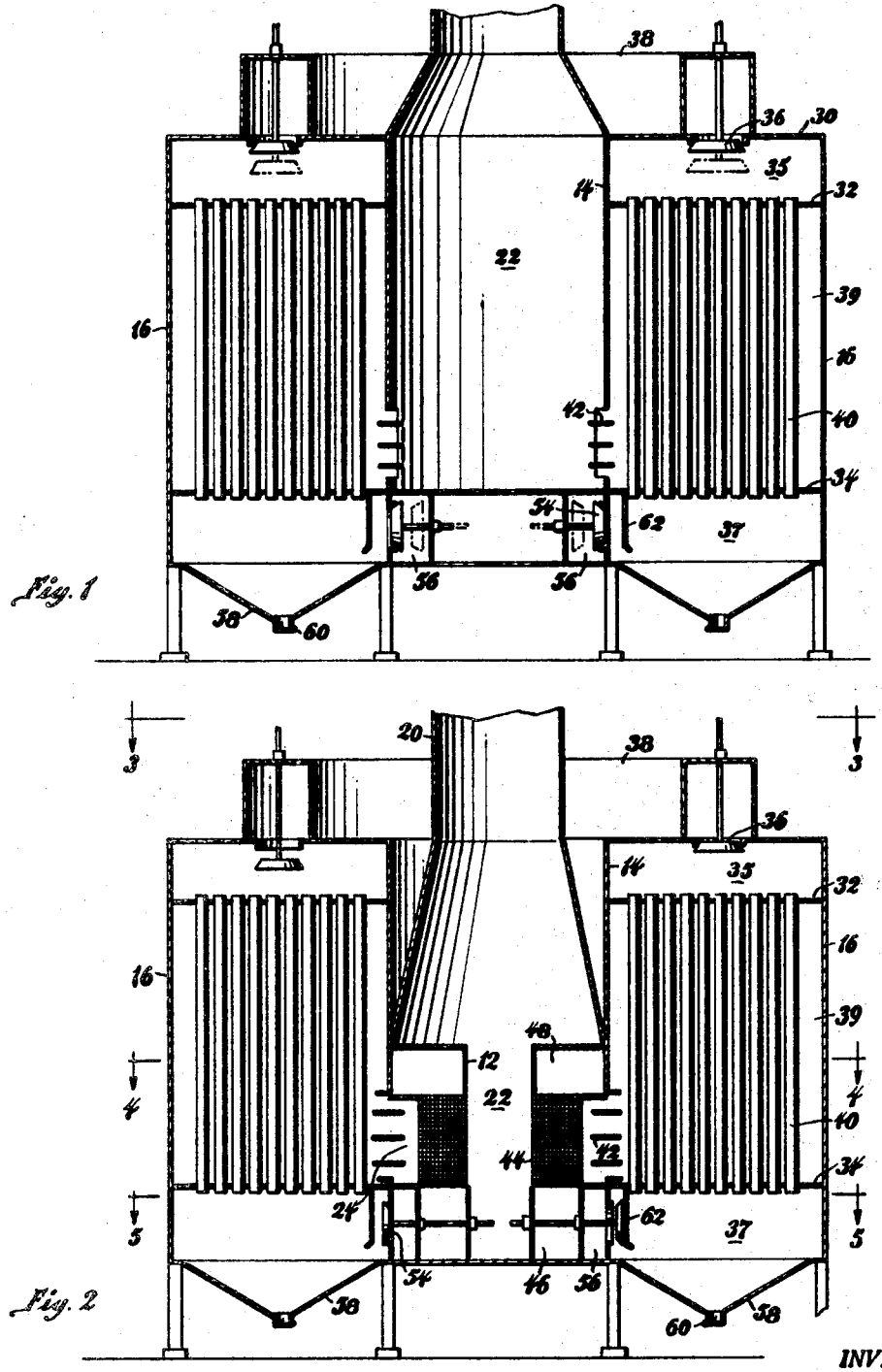
INVENTOR.
Robert M. Jensen
BY
Wayne Lang
AGENT June 18, 1968  R. M. JENSEN  3,388,534
BAG FILTER ARRANGEMENT Filed June 3, 1965  2 Sheets-Sheet 2

INVENTOR.
Robert M. Jensen
BY
Wayne Lang
AGENT

United States Patent Office 3,388,534
Patented June 18, 1968

3,388,534
BAG FILTER ARRANGEMENT
Robert M. Jensen, Wellsville, N.Y., assignor to The Air Preheater Company, Inc., New York, N.Y., a corporation of Delaware
Filed June 3, 1965, Ser. No. 460,959
2 Claims. (Cl. 55—269)

This invention relates to gas filter apparatus and particularly to a filter arrangement that combines bag filter apparatus with a heat exchanger to effectively utilize the heat content of hot dust-free gases passing therethrough before the gases are exhausted to the atmosphere.

Filter apparatus of the bag type usually comprises a multiplicity of porous filter bags arranged together in a housing known as a "bag house." This apparatus is provided with suitable duct and valve means arranged to direct the flow of dust-laden gas through the filter bags. Variations in size and capacity of such installations are customarily accommodated by merely varying the number of filter bags and the overall size of the installation. Thus each installation is individually designed and manufactured according to the requirements of a specific application.

A preferred arrangement is believed to be one in which filter units may be manufactured and installed in modular filter units which comprise a multiplicity of filter bags having an optimum arrangement. Such modular units may be readily added or removed as required to meet variations in design characteristics, and it therefore becomes a primary object of this invention to provide an arrangement for a modular unit of this general type.

It is a further object of this invention to provide a bag filter apparatus having optimum ducting arrangements.

It is a still further object of the present invention to provide a bag filter arrangement uniquely adapted for combination with heat exchange apparatus.

These and other objects of my invention will become more apparent when viewed in conjunction with the drawing in which:

FIGURE 1 is a schematic longitudinal section through apparatus embodying my basic invention;

FIGURE 2 is a schematic longitudinal section through apparatus involving the combination of bag filters and heat exchangers;

Figure 3:
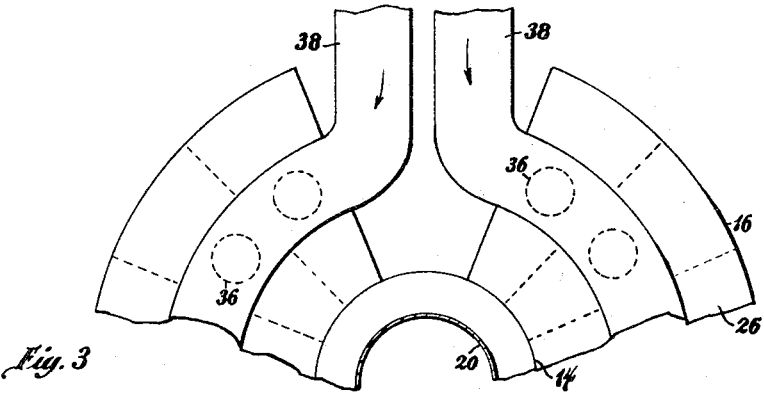
FIGURE 3 is a vertical section as seen from line 3—3 of FIGURE 2.
Figure 4:
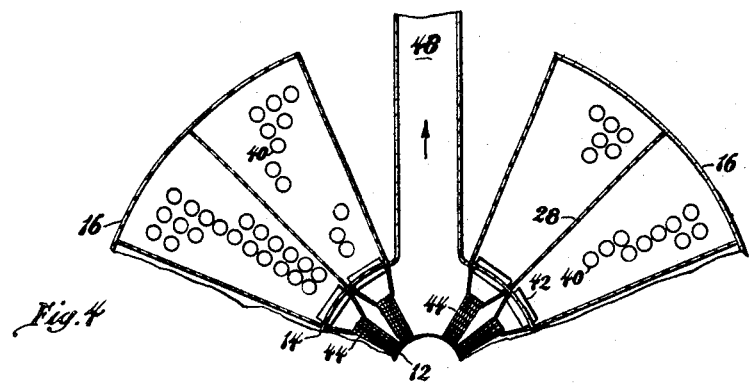
FIGURE 4 is a vertical section as seen from line 4—4 of FIGURE 2.
Figure 5:
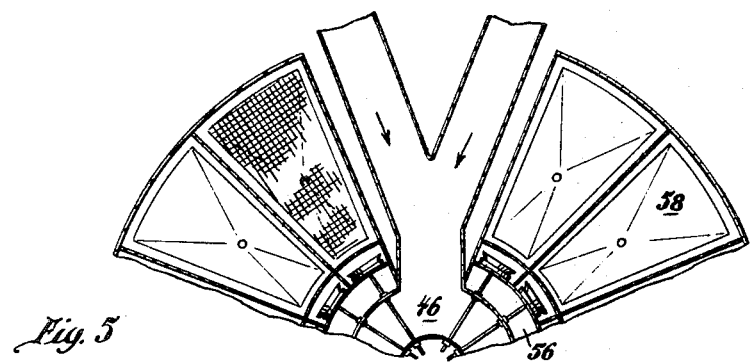
FIGURE 5 is a vertical section as seen from line 5—5 of FIGURE 2.

The apparatus of FIGURE 2 comprises essentially a plurality of concentric walls 12, 14 and 16 arranged to provide an independent inner exhaust chamber 22, a middle heat exchange chamber 24, and an outer gas filter chamber 26. A plurality of radial walls 28 extend between concentric walls 14 and 16 to form a series of sector-shaped compartments therebetween. The filter chamber 26 is provided with an annular end plate 30 and each sector-shaped compartment is provided with apertured tube sheets 32 and 34 positioned in axially spaced planes to provide upper and lower plenum chambers 35 and 37 and an intermediate chamber 39. The intermediate chamber 39 is traversed by a multiplicity of filter tubes or bags 40 that extend longitudinally between apertures of the spaced tube sheets.

The annular end plate 30 is provided with a valve means to open and close the port that leads to a supply duct 38 for hot dust-entrained gas. The lower end of each filter chamber 39 is provided with damper valve means 42 through which communication is afforded with the middle heat exchange chamber 24.

Heat exchange means 44 in the middle chamber 24 is adapted to receive the hot gas exhausting through damper valve 42 and direct it radially inward to the exhaust chamber 22 from which it is vented to the atmosphere. Gas to be heated in heat exchanger 44 is supplied thereto through inlet duct 46 and withdrawn through outlet duct 48 after having traversed the heat exchanger 44 in heat exchange relation with the hot gas.

An independent source of deflation gas preferably having a negative pressure is adapted to be supplied to the lower plenum chamber 37 of the outer compartments through an independently operable damper valve 54. When the deflation gas is given access to the lower plenum chamber 37 through damper 54 it is accordingly directed into the open ends of the filter tubes 40 where it deflates or otherwise distorts the tubes sufficient to dislodge deposits of particulate matter (filter cake) and allow it to fall by gravity to hoppers 58 for ultimate removal from the system.

During normal operation hot, dust-bearing gas enters the plenum chamber 35 of the apparatus through the supply duct 38 and the open supply valve 36. The gas passes downward into the tubes 40 and through their porous walls where dust is removed from the gas and deposited on the tube walls. After traversing the porous filter tubes the then clean gas passes through the open damper valves 42 to the heat exchange chamber 24. While traversing the heat exchanger the hot clean gas gives up heat to a fluid to be heated which enters the heat exchanger 44 from an inlet duct 46 and is exhausted through an outlet duct 48.

After giving up its heat in the heat exchanger, the then cooled gases are exhausted to the inner chamber 22 where they are vented to the atmosphere through the central stack 20.

Although the heat exchanger means 44 is illustrated as a plate type unit, equivalent tubular or regenerative type apparatus could be substituted therefor without altering the basic concept of the invention.

When it is determined that removal of the collected filter cake is necessary to maintain optimum operating efficiency of the filter, the supply 36 is closed so as to isolate the particular compartment being cleaned from its normal flow of dust-entrained gas. Damper valve 54 is summarily opened and a source of negative pressure (suction) from duct 56 is supplied to the plenum chamber 42 and the interior of filter tubes 35 to cause them to deflate or distort and break loose any filter cake adhering thereto. As the filter cake breaks loose from the inner walls of the filter tubes it falls by gravity to the hopper 58 where it is collected for eventual removal from the system through clean-out doors 60. Baffle plates 62 adjacent each damper valve 54 are adapted to reduce the amount of loose filter cake from tubes 40 which may be drawn through the valve port to the source of suction.

Where the occasion demands the heat exchange apparatus may be eliminated entirely from the system in the manner illustrated by FIGURE 1 of the drawing. Here the annular series of filter compartments 28 exhaust hot dust-free gas through the open damper 42 directly to the exhaust chamber 22 from which it is vented to the atmosphere.

While this invention has been described with reference to the embodiment illustrated in the drawing, it is evident that numerous changes may be made without departing from the spirit of the invention. It is therefore intended that all matter contained in the above description or shown in the accompanying drawings shall be interpreted as illustrative and not in a limiting sense.

I claim:
1. Gas treatment apparatus for filtering a heating gas and utilizing the heat content of said gas to preheat a gas to be heated comprising fixed concentric walls that define inner, middle and outer gas chambers, radial walls dividing the outer chamber into a series of similar compartments, axially spaced inlet and outlet duct means connected to each of said compartments for the supply and exhaust of a heating gas, a series of porous filter tubes in each of said compartments intermediate the inlet and outlet ducts, heat exchange means in the middle chamber receiving hot gas from the outlet ducts in said compartments and exhausting it to said inner chamber, a source of gas to be heated, independent inlet and outlet passageways directing the gas to be heated through said heat exchange means in heat exchange relation with the heating gas, valve means in the inlet and outlet duct means of each compartment regulating the flow of heating gas therethrough, a source of deflation gas under negative pressure, and means directing the deflation gas into said filter tubes to deflate said tubes and release particulate matter therefrom.

2. Gas treatment apparatus for filtering a heating gas and utilizing the heat content thereof to preheat a gas to be heated comprising a plurality of annular walls arranged concentrically to enclose an inner, middle and outer gas chamber, radial walls dividing the outer chamber into a series of similar compartments, apertured tube sheets dividing said similar compartments into upper and lower plenum chambers with a filter chamber therebetween, an inlet duct with control means supplying dust-entrained gas to the upper plenum chambers, filter tubes intermediate the apertures of said tube sheets, heat exchange means in said middle chamber arranged to receive hot gas from said filter chamber and exhaust it radially inward to said inner chamber, a valved means directing the hot filtered gas from said filter chambers to said middle chamber, a source of fluid to be heated, inlet and outlet ducts connected to the middle chamber directing the fluid to be heated through said heat exchange means in heat exchange relation with the hot filtered gas, a source of negative pressure, duct means for directing the negative pressure into said filter tubes to vary their configuration and release filtered matter therefrom, and hopper means subjacent said outer chamber adapted to receive the particulate matter when released from said filter tubes.

References Cited

UNITED STATES PATENTS

| | | | |
|---|---|---|---|
| 199,357 | 1/1878 | Dickerson | 55—268 |
| 1,974,952 | 9/1934 | Eiben | 55—341 |
| 2,215,337 | 9/1940 | Silverstein | 55—269 |
| 2,537,558 | 1/1951 | Tigges | 55—135 X |
| 3,057,137 | 10/1962 | Perlis et al. | 55—341 X |
| 3,097,936 | 7/1963 | Lincoln | 55—283 X |
| 3,124,443 | 3/1965 | Hellingman et al. | 55—269 X |
| 3,129,082 | 4/1964 | Roozendaal. | |
| 3,146,080 | 8/1964 | Ruble et al. | 55—302 X |
| 3,247,681 | 4/1966 | Hankinson et al. | 55—268 X |

FOREIGN PATENTS

| | | |
|---|---|---|
| 326,831 | 6/1903 | France. |
| 771,025 | 7/1934 | France. |
| 122,982 | 8/1901 | Germany. |
| 838,108 | 5/1952 | Germany. |

HARRY B. THORNTON, *Primary Examiner.*

D. TALBERT, *Assistant Examiner.*